(12) United States Patent
Hicks

(10) Patent No.: US 6,257,669 B1
(45) Date of Patent: Jul. 10, 2001

(54) DUAL TRAILER

(76) Inventor: W. Glen Hicks, P.O. Box 914, Minden, LA (US) 71055

( * ) Notice: Subject to any disclaimer, the term of this patent is extended or adjusted under 35 U.S.C. 154(b) by 0 days.

(21) Appl. No.: 09/297,757

(22) PCT Filed: Sep. 4, 1998

(86) PCT No.: PCT/US98/18470

§ 371 Date: Jan. 21, 2000

§ 102(e) Date: Jan. 21, 2000

(87) PCT Pub. No.: WO99/11477

PCT Pub. Date: Mar. 11, 1999

Related U.S. Application Data
(60) Provisional application No. 60/058,071, filed on Sep. 5, 1997.

(51) Int. Cl.[7] ............................................. B60P 1/16
(52) U.S. Cl. ........................ 298/8 T; 298/8 R; 280/149.2
(58) Field of Search .................... 298/8 T, 8 R, 298/8 H; 280/411.1, 43.15, 43.16, 149.2

(56) References Cited

U.S. PATENT DOCUMENTS

| | | | |
|---|---|---|---|
| 3,120,408 | 2/1964 | Pruss | 298/8 R |
| 3,152,837 | 10/1964 | Margala | 298/8 R |
| 3,181,914 * | 5/1965 | Humes | 280/149.2 |
| 3,193,330 * | 7/1965 | Hribar, Jr. | 298/8 R |
| 3,674,312 * | 7/1972 | O'Rear | 298/8 T |
| 4,033,625 * | 7/1977 | Fikse | 280/149.2 X |
| 4,365,820 * | 12/1982 | Rush | 280/149.2 X |
| 4,531,753 | 7/1985 | Hicks . | |
| 4,580,844 * | 4/1986 | Farmer | 298/8 T |
| 4,664,446 * | 5/1987 | Word | 298/8 H |
| 4,674,942 * | 6/1987 | Assh et al. | 298/8 T |
| 4,865,341 * | 9/1989 | Hicks | 280/149.2 |
| 4,958,845 * | 9/1990 | Parks | 280/149.2 X |
| 5,860,668 * | 1/1999 | Hull et al. | 280/149.2 X |

FOREIGN PATENT DOCUMENTS

475334 * 6/1975 (SU) .................................. 298/8 T

* cited by examiner

Primary Examiner—Stephen T. Gordon
(74) Attorney, Agent, or Firm—Thompson & Gustavson L.L.P.

(57) ABSTRACT

A dual trailer assembly (10) is provided which provides for operating two end dump trailers (12, 14) with a single cab (16). The operation is possible by use of a moveable pedestal (30) having a fifth wheel mounted on the forward end dump trailer (12). The pedestal (30) is in the rearward, trailing position to attach the rearward end dump trailer (14) at the fifth wheel (110) on the pedestal for towing. Upon arrival at the dump site, the rearward end dump trailer (14) can be dumped and then detached from the forward end dump trailer (12). The pedestal (30) mounting the fifth wheel will move forward to a forward, dumping position, permitting the contents of the forward end dump trailer (12) to be dumped.

9 Claims, 7 Drawing Sheets

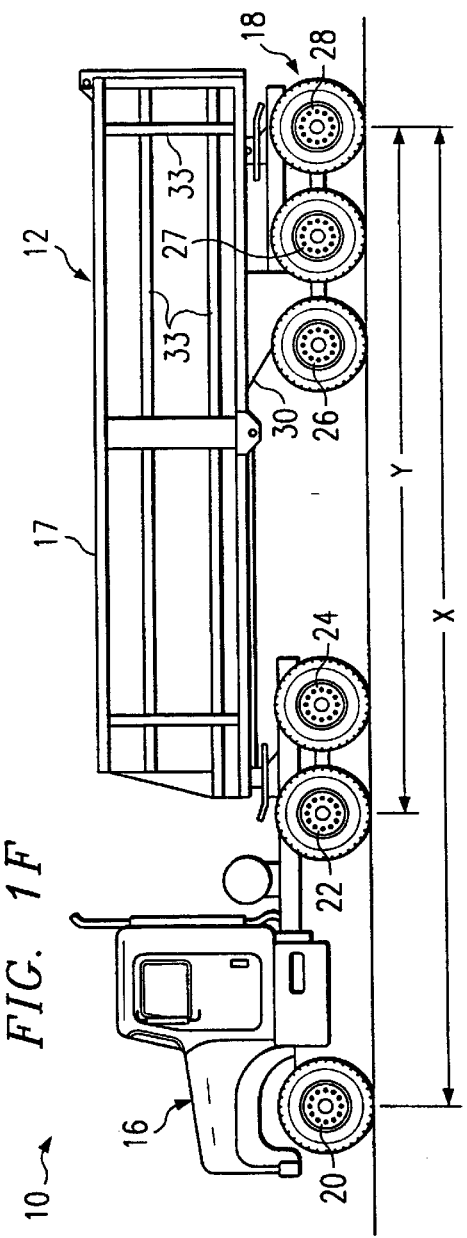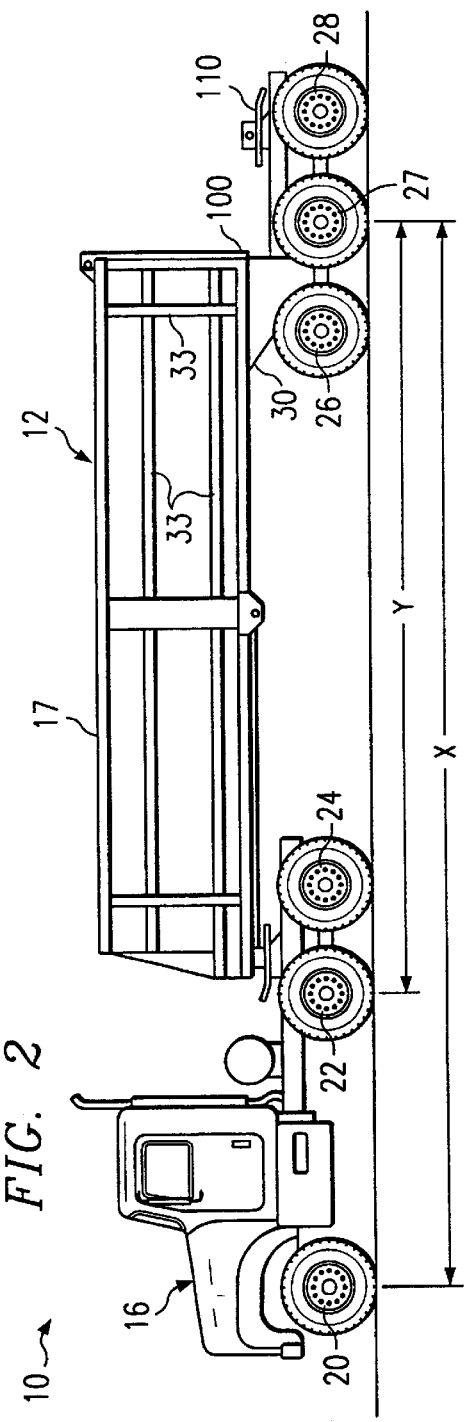

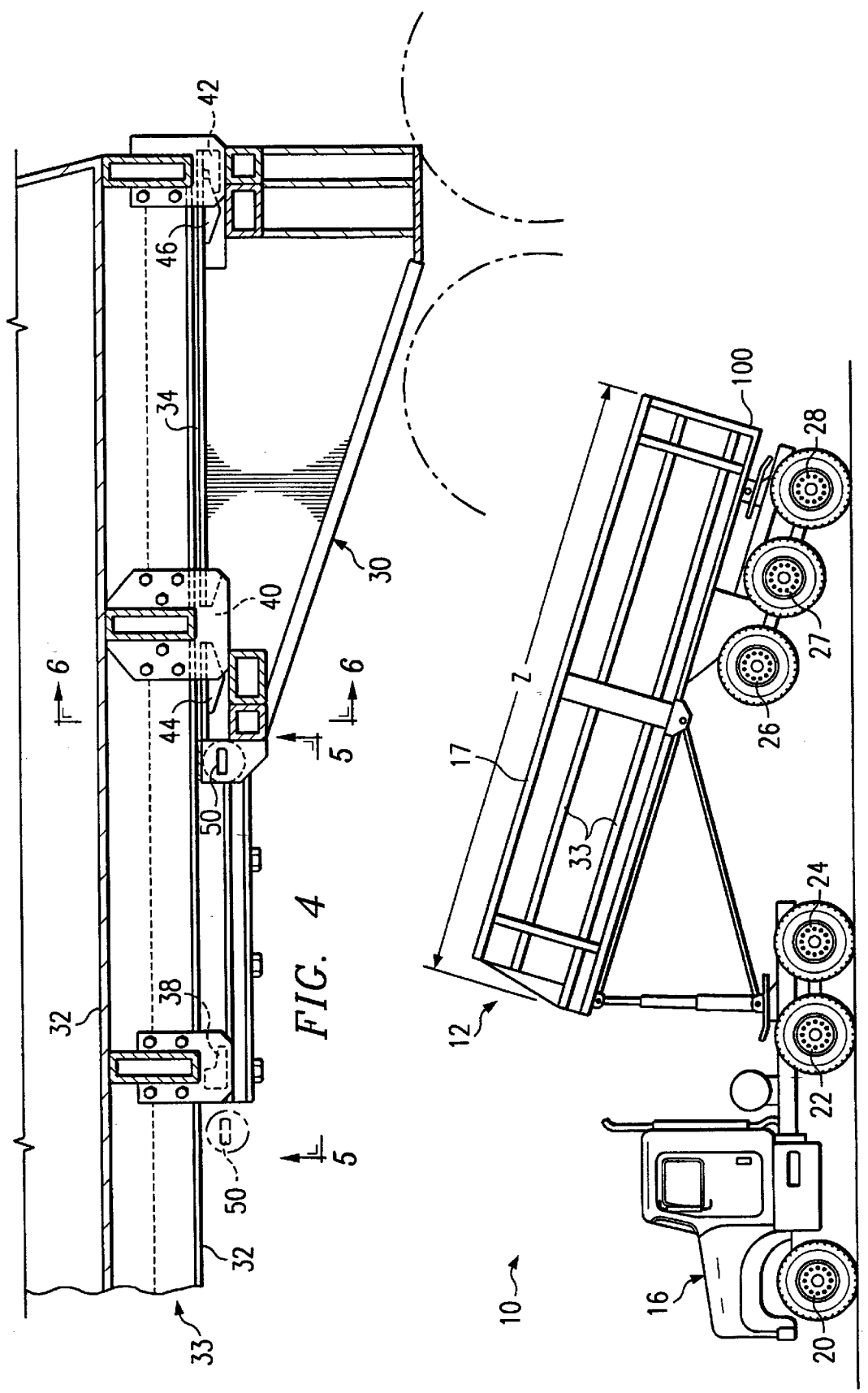

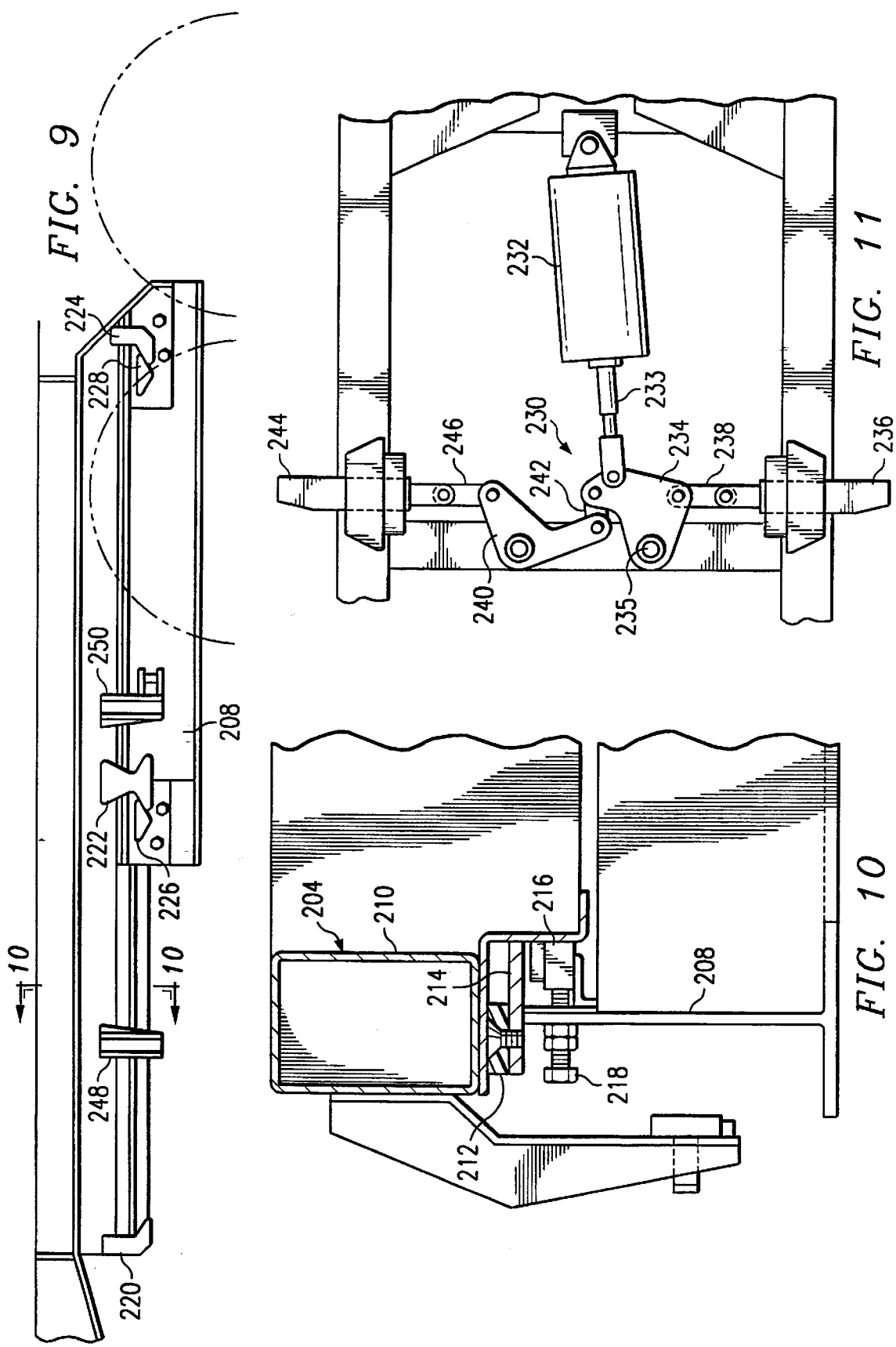

DUAL TRAILER

CROSS REFERENCE TO RELATED APPLICATION

This application claims priority to Provisional Application Ser. No. 60/058,071 filed on Sep. 5, 1997.

TECHNICAL FIELD OF THE INVENTION

This invention relates to payload bearing vehicles, and in particular to dump trailers.

BACKGROUND OF THE INVENTION

In hauling materials over the highways, particularly materials within dump trailers, there is a conflict between the desire to carry as much material as possible and weight limitations regulating the gross weight of a highway vehicle established in many jurisdictions within the United States and foreign countries. The gross weight permitted under law is typically related to the vehicle size, and particularly to the vehicle wheel base. In particular, the gross weight permitted is often related to the number of axles on the vehicle and the wheel base defined as the distance between selected axles. In the common semi-trailer type configuration including a power unit and a trailer, the wheel base can be measured a number of ways. The wheel base can be measured between the leading and trailing axles of the trailer, between the leading drive axle of the power unit and the trailing axle of the trailer or between the steering axle of the power unit and the trailing axle of the trailer.

A need continues to exist for optimizing the load carrying capability of a vehicle while complying with the relevant laws governing vehicle weight. By carrying fewer, heavier loads, the operator can save expenses as well as reduce impact in neighborhoods by passage of the vehicles.

SUMMARY OF THE INVENTION

In accordance with one aspect of the present invention, a dual dump trailer assembly is provided which includes a cab, a first end dump trailer for attachment to said cab with the first end dump trailer having a pedestal for movement between a forward, dumping position and a rearward, towing position and a second end dump trailer for attachment to said first end dump trailer at the pedestal in the rearward, towing position. In accordance with another aspect of the present invention, the pedestal on the first end dump trailer mounts a fifth wheel.

BRIEF DESCRIPTION OF THE DRAWINGS

A more complete understanding of the invention and its advantages will be apparent from the following detailed description when taken in conjunction with the accompanying drawings, in which:

FIG. 1F is a side view of the cab and forward end dump trailer illustrating the pedestal in the forward, dumping position;

FIG. 2 is a side view of the cab and forward end dump trailer with the pedestal in the rearward, towing position;

FIG. 3 is a side view of the cab and forward end dump trailer with the trailer body in the tilted position for dumping the payload;

FIG. 4 is a side view of a portion of the forward end dump trailer illustrating the wedge structure;

FIG. 9 is a side view of a portion of the frame type forward end dump trailer;

FIG. 10 is a cross-sectional view of the frame and forward dump trailer taken along line 10—10 in FIG. 9; and FIG. 11 is a plan view of the locking mechanism of the frame type forward end dump trailer.

DETAILED DESCRIPTION OF THE INVENTION

Figure 1A:
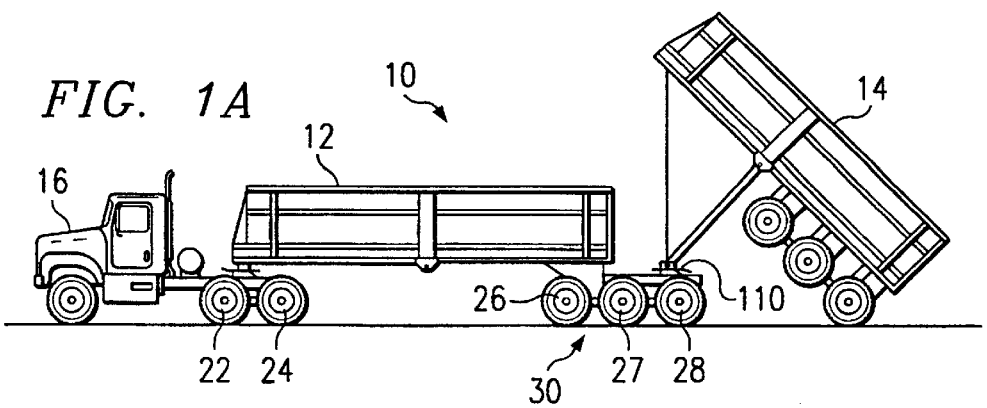
FIG. 1A is a side view of a dual dump trailer assembly forming a first embodiment of the present invention illustrating the rear dump trailer in dumping position.
Figure 1B:
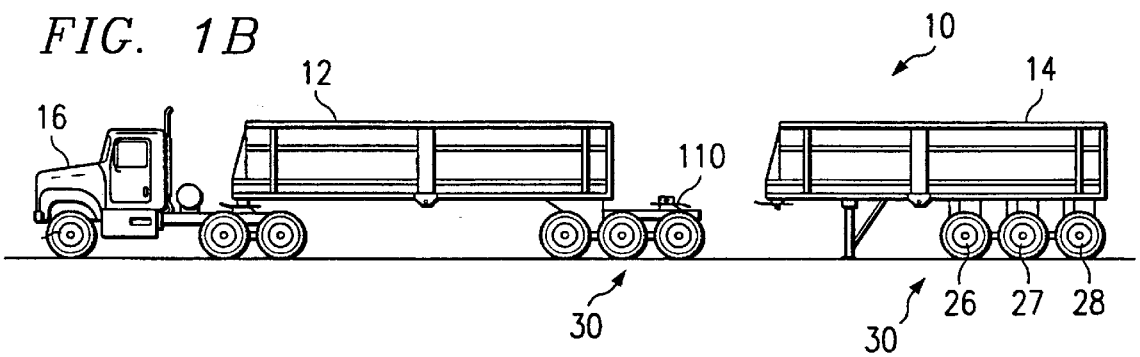
FIG. 1B is a side view of the dual dump trailer assembly illustrating the rearward end dump trailer removed from attachment to the pedestal on the front end dump trailer after having dumped its load.
Figure 1C:
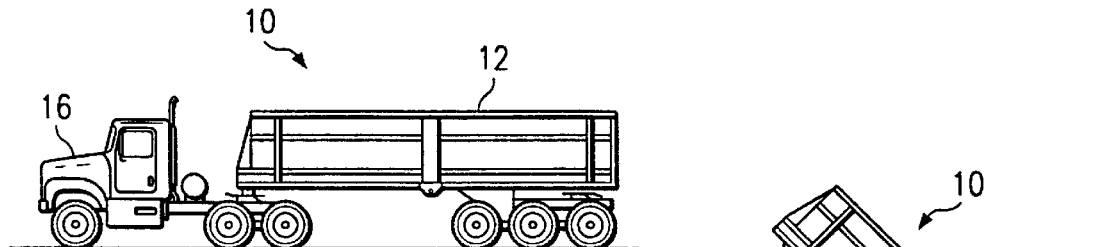
FIG. 1C illustrates the dual dump trailer assembly with the pedestal on the forward end dump trailer moved into the forward, dumping position.
Figure 1D:
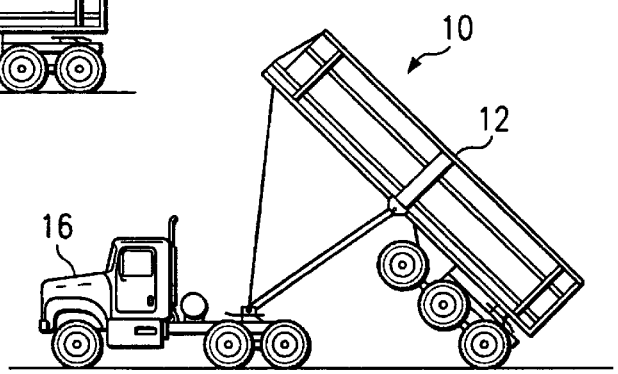
FIG. 1D illustrates the forward end dump trailer moved into the dumping position.
Figure 1E:
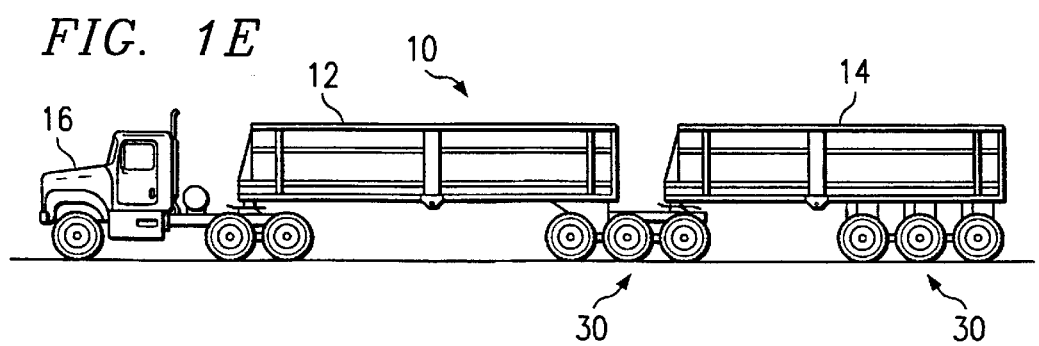
FIG. 1E illustrates the dual dump trailer assembly with the rearward end dump trailer attached to the pedestal of the forward end dump trailer so that the dual dump trailer assembly can be driven down the highway.

Referring now to the drawings, wherein like reference characters designate like or corresponding parts throughout the several views, and in particular to FIGS. 1A–1E, a dual dump trailer assembly 10 is illustrated which provides for operating two end dump trailers, a forward end dump trailer 12 and rearward end dump trailer 14, with a single cab or power unit 16. At least the forward end dump trailer 12 is provided with a pedestal 30 which can be moved on the forward end dump trailer 12 between a forward, dumping position and a rearward, trailing position. While trailering both end dump trailers, the pedestal 30 is in the rearward position as illustrated in FIG. 1E, allowing the rearward end dump trailer 14 to be towed thereby. Rearward end dump trailer 14 attaches to a fifth wheel 110 forming part of the pedestal 30 for towing. When dumping, the rearward end dump trailer 14 is dumped first, as seen in FIG. 1A. The rearward end dump trailer 14 is then removed from the assembly as seen in FIG. 1B. The pedestal 30 is moved forward relative the rest of the forward end dump trailer 12 until the pedestal is in the forward position completely underneath the forward end dump trailer 12 and forward of the end of the forward end dump trailer 12 as seen in FIG. 1C to allow the forward end dump trailer to be dumped, as seen in FIG. 1D.

While the rearward end dump trailer 14 does not require a sliding pedestal 30, it is preferred that the trailers 12 and 14 are identical and therefore interchangeable in the role of the forward or rearward end dump trailer. However, if desired, rearward end dump trailer 14 can be any style of end dump trailer suitable for attachment to fifth wheel 110. A sliding pedestal 30 of the type contemplated is disclosed in the present inventor's prior issued U.S. Pat. No. 4,531,753 issued Jul. 30, 1985, U.S. Pat. No. 4,660,843, issued Apr. 28, 1987, and U.S. Pat. No. 4,865,341, issued Sep. 12, 1989. All three patents are incorporated by reference herein in their entirety.

With reference to FIG. 1F and FIG. 2, additional details of the cab 16 and forward end dump trailer 12 will be described. The rearward end dump trailer 14 can be identical to forward end dump trailer 12 and therefore need not be described. The forward end dump trailer 12 is a frameless style. The end dump trailer 12 is in the horizontal position shown in FIG. 1F and 2 during loading of the payload and while traveling on the highway. When the payload is to be dumped, a hydraulic mechanism in the forward end dump trailer 12 will pivot the trailer body 17 to an angle up to approximately 50 degrees from the horizontal to dump, as seen in FIG. 3.

As set forth in the background of the invention, local jurisdictions have restrictions on gross vehicle weight based on certain lengths between axles on a vehicle. The trailer assembly 10 illustrated has a steering axle 20 and forward and rearward drive axles 22 and 24 on the cab 16. Forward end dump trailer 12 has a forward trailing axle 26, a middle trailing axle 27 and a rearward trailing axle 28, while the rearward end dump trailer 14 also has a forward trailing axle 26, a middle trailing axle 27 and a rearward trailing axle 28. The axles 26, 27 and 28 are part of rear wheel unit 18 which is mounted to pedestal 30. The various distances between these axles can be optimized, partly by providing for the appropriate position of the pedestal 30 in the rearward, towing position, to provide an optimal load for the given weight restriction laws in a particular jurisdiction.

In the normal construction of an end dump trailer, the rear wheel unit 18 must be positioned relative to the body as illustrated in FIGS. 1F and 3 to permit the trailer body 17 to pivot upward for dumping of the payload. If the rear wheel unit 18 was permanently mounted behind the dumping lift 100 of the trailer body 17 seen in FIG. 3, a protective shield or ramp would be required to protect the unit 18 from damage from the payload during dumping. Also, the maximum dumping angle of the trailer body 17 generally decreases as wheel unit 18 is positioned further back on the trailer 12.

In accordance with the teachings of the present invention, the pedestal 30 supporting the rear wheel unit 18 on the forward end dump trailer 12 is slidable along a portion of the length of the trailer between the forward, dumping position shown in FIGS. 1F and 3 and the rearward, towing position shown in FIG. 2. By sliding the pedestal 30 into the rearward, towing position, the wheel base X on the dump trailer assembly 10 has been increased.

Figure 6:
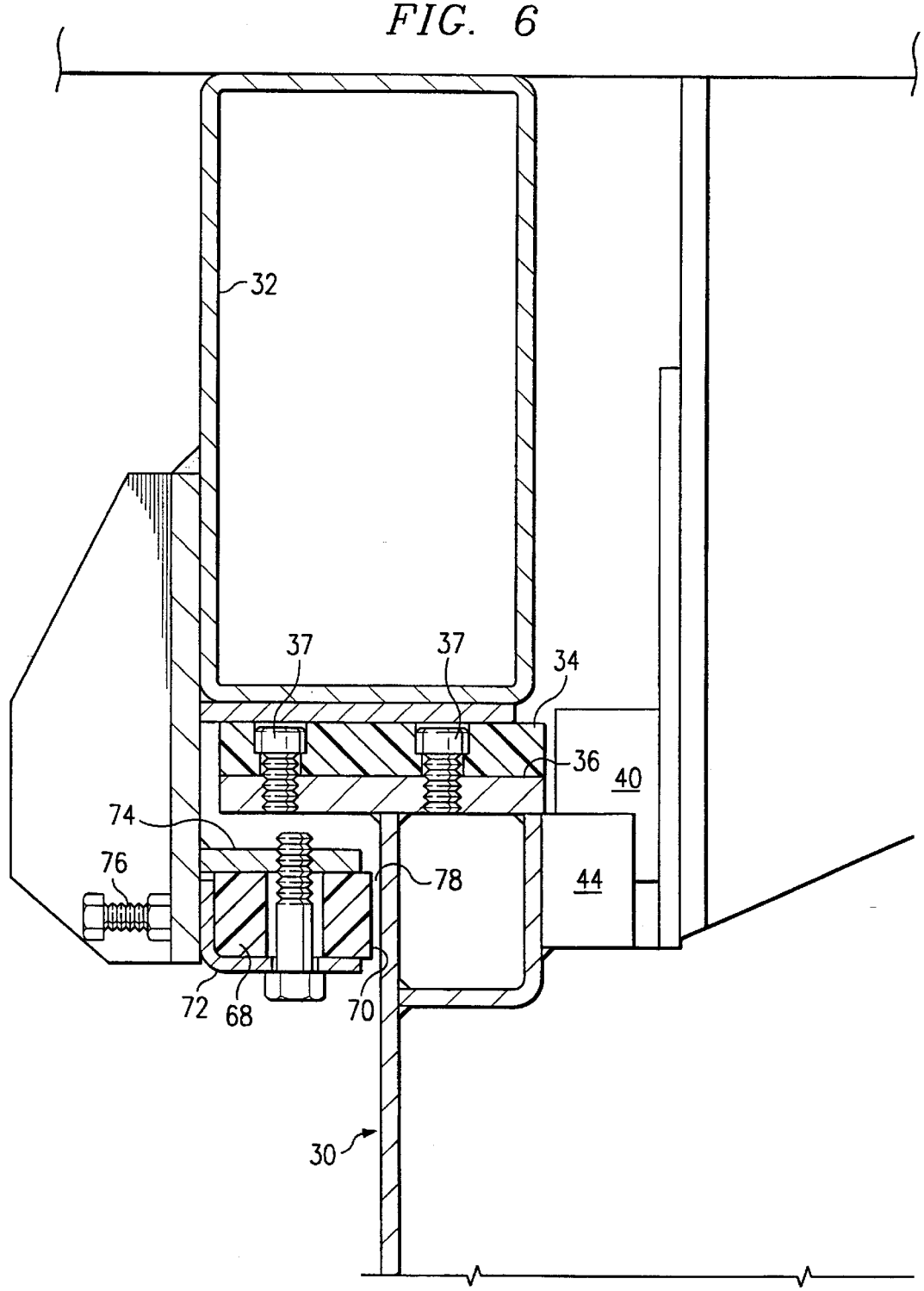
FIG. 6 is a vertical cross section in the forward end dump trailer taken along line 6—6 in FIG. 4.

With reference to FIGS. 4 and 6, the pedestal 30 slidably contacts the bottom of channels 32 forming part of the frame 33 of the trailer body 17 and located on either side of the trailer body. Polyethylene pads 34 are bolted to the surface 36 of the pedestal 30 by bolts 37 proximate the channels 32 to reduce friction between the trailer body 17 and pedestal 30 and also to provide a cushioning action between the two elements.

Forward frame wedges 38, middle frame wedges 40 and rearward frame wedges 42 are positioned on either side of the trailer body 17 on the channels 32. The frame wedges 38, 40 and 42 cooperate with the forward pedestal wedges 44 and rearward pedestal wedges 46. In the forward position of pedestal 30 shown in FIGS. 1F and 3, the forward pedestal wedges 44 engage the forward frame wedges 38 and the rearward pedestal wedges 46 engage a portion of the middle frame wedges 40. In the rearward position illustrated in FIGS. 2 and 4, the forward pedestal wedges 44 are engaged with a portion of the middle frame wedges 40 and the rearward pedestal wedges 46 are engaged with the rearward frame wedges 42 to wedge the pedestal to the frame 33 in the rearward position.

Figure 5:
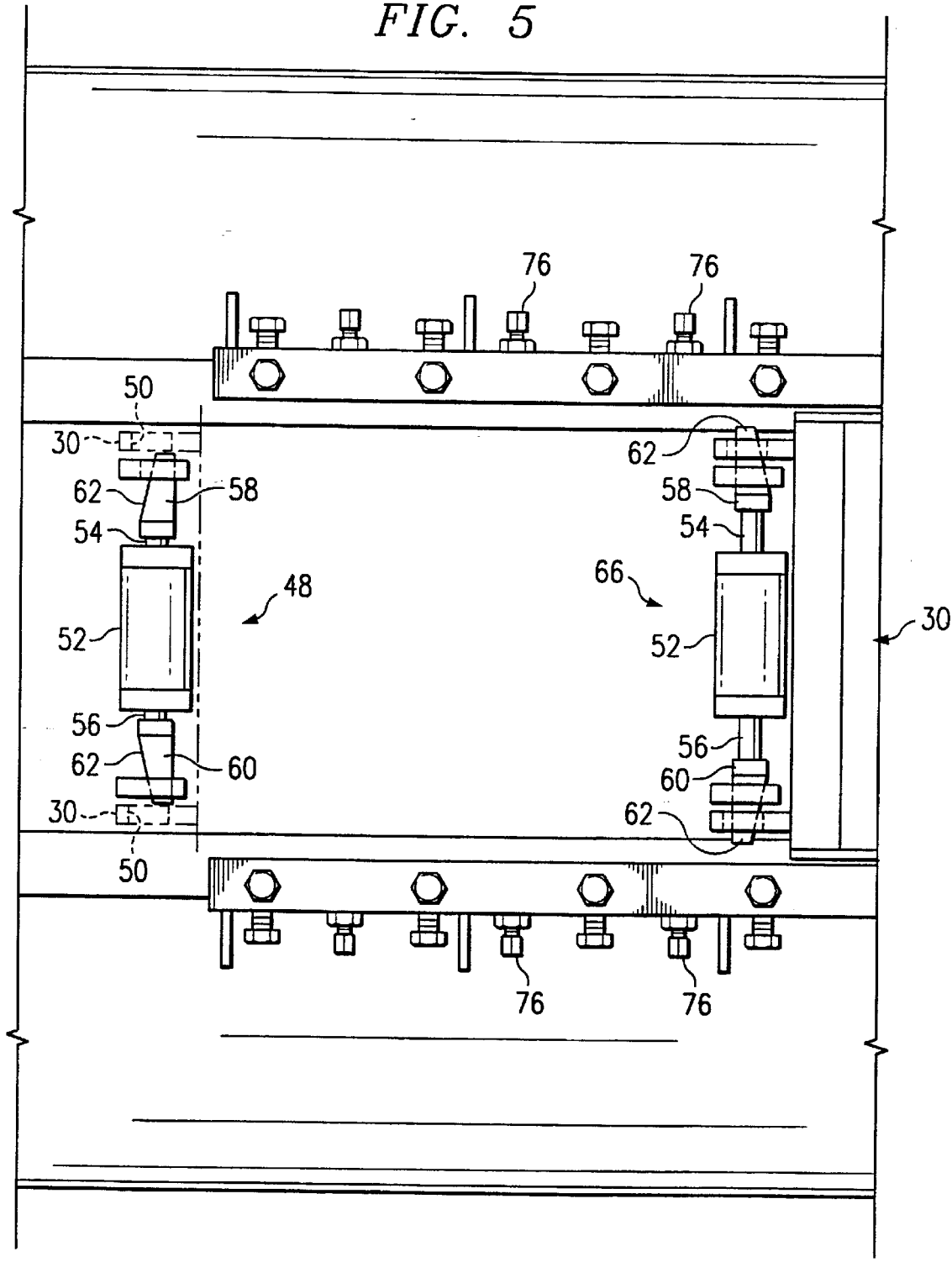
FIG. 5 is a top view of a portion of the forward end dump trailer along line 5—5 in FIG. 4 to illustrate the locking structure.

A forward locking assembly 48, shown in FIG. 5, is mounted on frame 33 and cooperates with locking holes 50 formed in the pedestal 30 as shown in FIG. 4. The forward locking assembly 48 comprises a dual double acting cylinder 52 having pistons 54 and 56 shown in their retracted positions in FIG. 5. Locking wedges 58 and 60 are positioned at the end of pistons 54 and 56, respectively. When the pedestal is moved into the forward position by locking the brakes on the rear wheel unit 18 of the forward end dump trailer 12, and backing the cab 16, the pistons 54 and 56 can be activated to drive the locking wedges 58 and 60 into the locking holes 50. The wedges 58 and 60 have wedge surfaces 62 which act to wedge the pedestal wedges into the frame wedges when the pistons 54 and 56 move outwardly from the dual cylinder 52. In the forward position, the dual dump trailer assembly 10 is adapted for the dumping of the payload of the forward end dump trailer 12.

A rearward locking assembly 66 is also mounted on the frame 33. The rearward locking assembly 66 comprises the identical elements of forward locking assembly 48 but with the wedge surfaces 62 oriented in the direction opposite those in the forward locking assembly 48. To move the pedestal 30 into the rearward position, the brakes on unit 18 are again locked and the cab 16 is moved forward. The rearward locking assembly 66 will act to wedge the pedestal wedges into the frame wedges when the pedestal 30 is in the rearward position for travel on a public highway.

The pedestal 30 is aligned with the frame 33 by polyethylene blocks 68 having guide surfaces 70 as best shown in FIG. 6. The blocks 68 are secured to angle members 72 which are bolted to a flange 74 on each side of the frame 33 as best seen in FIG. 6. The angle members 72 and blocks 68 can be adjusted inwardly toward the pedestal or outwardly from the pedestal by adjusting screws 76. Typically, a small gap 78 will be maintained between the guide surfaces 70 and the pedestal 30. The polyethylene blocks 68 will maintain the pedestal 30 aligned with the frame 33 both in the forward and rearward positions and while moving between the positions.

In the preferred construction, the dual cylinders 52 in both the forward and rearward locking assemblies 48 and 66 are double acting and operated by air pressure. This will permit the locking assemblies to be operated by the vehicle operator from within the cab 16.

Figure 7:
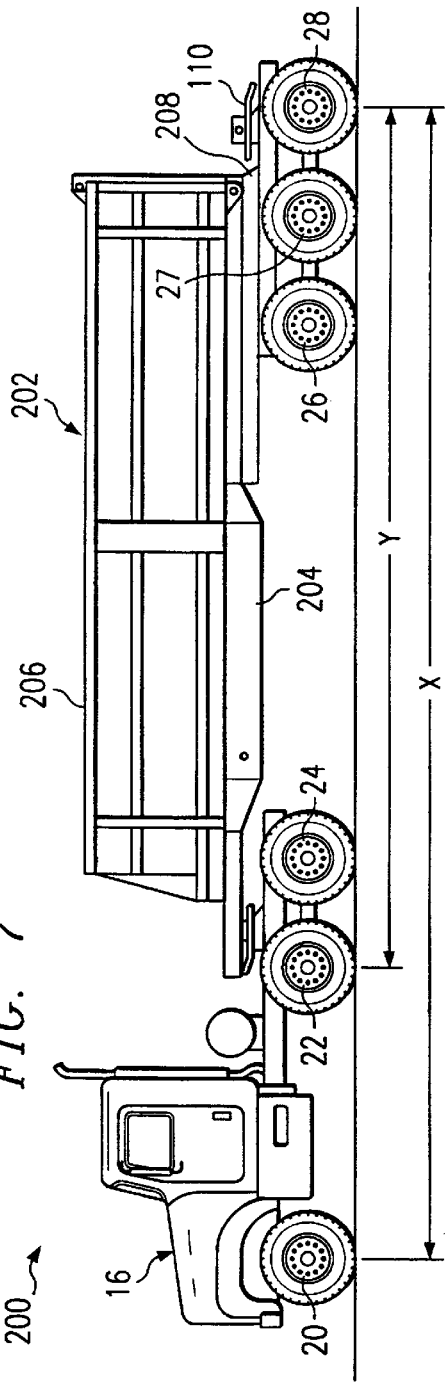
FIG. 7 is a side view of a cab and a frame type forward end dump trailer with the pedestal in the rearward position for towing forming a first modification of the present invention.
Figure 8:
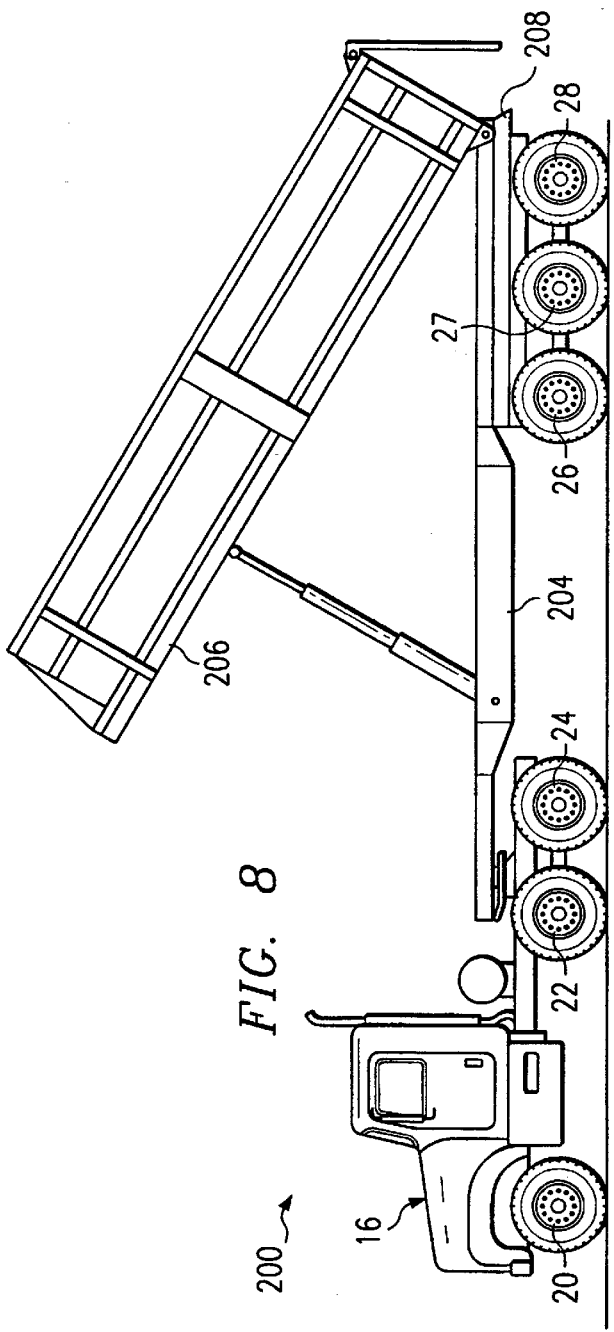
FIG. 8 is a side view of the cab and the frame type forward end dump trailer illustrating the pedestal in the forward position for dumping operation.

The assembly 10 described above and illustrated in FIGS. 1–6 is commonly referred as having frameless end dump trailers, as the main frame and the trailer body of end dump trailers 12 and 14 are integral. FIGS. 7–11 illustrate a dual dump trailer assembly 200 which incorporates a frame type forward end dump trailer 202 and a rearward frame type end dump trailer 203 (not shown but identical to forward frame type end dump trailer 202). However, in all other respects, the assembly 200 operates in the same manner as assembly 10. Forward frame end dump trailer 202 is identical to trailer 203, and only trailer 202 will be described. The trailer 202 includes a separate horizontal rigid frame 204 which is attached at its forward end to the cab 16 and a trailer body 206 which is pivoted near the dumping end of the rigid frame 204 for pivotal motion between a horizontal traveling position, as shown in FIG. 7, and a tilted dumping position as shown in FIG. 8.

The trailer 202 is provided with a pedestal 208 which performs the identical function of pedestal 30 discussed previously in permitting dumping of the trailer body 206 when in the forward position shown in FIG. 8 and for trailering when in the rearward position shown in FIG. 7.

As best seen in FIG. 10, the pedestal 208 slidably contacts the bottom of channels 210 forming part of the frame 204. Polyethylene pads 212 are bolted to the upper surface 214 of the pedestal 208 to reduce friction between the trailer frame 204 and pedestal 208 and also to provide a cushioning action between the two elements. An adjustable side bearing 216 is mounted on the pedestal by a threaded bolt 218. The threaded bolt 218 can be rotated to move the side bearing 216 into contact with the side of the frame 204 to insure the pedestal will slide along the length of the frame without jamming.

As best seen in FIG. 9, the trailer 202 includes forward frame wedges 220, middle frame wedges 222 and rearward frame wedges 224 positioned on either side of the frame 204 on the channels 210. The pedestal 208 is provided with forward pedestal wedges 226 and rearward pedestal wedges 228 on either side of pedestal 208. When the pedestal 208 is in the forward position, the forward pedestal wedges 226 engage the forward frame wedges 220 and the rearward pedestal wedges 228 engage a portion of the middle frame wedges 222. In the rearward position, illustrated in FIG. 9, the forward pedestal wedges 226 engage a portion of the middle frame wedges 222 and the rearward pedestal wedges 228 are engaged with the rearward frame wedges 224.

With reference to FIG. 11, the locking assembly 230 is illustrated. The locking assembly 230 is mounted on the pedestal 208 and includes an air cylinder 232 having a piston 233. A pivot plate 234 is pivotally mounted to the pedestal at pivot 235 and to the end of the piston 233. Locking wedge 236 is connected to plate 234 by a pivotal link 238. A second pivot plate 240 is pivoted to the pedestal and connected to the plate 234 by a pivotal link 242. The opposite locking wedge 244 is connected to plate 240 by a pivotal link 246. As can be seen, when air is provided to cylinder 232 to extend the piston 233, the wedges 236 and 244 are retracted. When air is provided to the cylinder to retract piston 233, the wedges extend outwardly for locking the pedestal either in the forward position against the forward lock plate assemblies 248 or in the rearward position with rear lock plate assemblies 250. In operation, the vehicle 200 is operated in an identical manner to the dump trailer assembly 10 described hereinabove.

Although several embodiments of the present invention have been illustrated in the accompanying drawings and described in the foregoing detailed description, it will be understood that the invention is not limited to the embodiments disclosed, but is capable of numerous rearrangements, modifications and substitutions of parts and elements without departing from the scope and spirit of the invention.

What is claimed is:

1. A dump trailer assembly, comprising:
   a cab;
   a first end dump trailer for attachment to said cab, said first end dump trailer having a pedestal for movement between a forward, dumping position and a rearward, towing position; and
   a second end dump trailer for attachment to said first end dump trailer at the pedestal when the pedestal is in the rearward, towing position.

2. The dump trailer assembly of claim 1 wherein the pedestal mounts a fifth wheel.

3. The dump trailer assembly of claim 2 wherein the second end dump trailer has a pedestal for movement between a forward, dumping position and a rearward, towing position, permitting the first and second end dump trailers to be interchangeable.

4. The dump trailer assembly of claim 1 wherein the first and second end dump trailers are frameless.

5. The dump trailer assembly of claim 1 wherein the first and second end dump trailers are frame type.

6. The dump trailer assembly of claim 1 wherein the second end dump trailer is dumped while attached to the first end dump trailer.

7. The dump trailer assembly of claim 1 wherein the second end dump trailer does not have a pedestal for movement between a forward, dumping position and a rearward, towing position.

8. A dump trailer assembly, comprising:
   a cab;
   a first end dump trailer for attachment to said cab, said first end dump trailer having a pedestal for movement between a forward, dumping position and a rearward, towing position, the pedestal having a fifth wheel, the first end dump trailer dumping its load when the pedestal is in the forward, dumping position, the first end dump trailer being frameless; and
   a second end dump trailer for attachment to said fifth wheel of said first end dump trailer at the pedestal when the pedestal is in the rearward, towing position, the second end dump trailer dumping its load when attached to the first end dump trailer.

9. A dump trailer assembly, comprising:
   a cab;
   a first end dump trailer for attachment to said cab, said first end dump trailer having a pedestal for movement between a forward, dumping position and a rearward, towing position, the pedestal having a fifth wheel, the first end dump trailer dumping its load when the pedestal is in the forward, dumping position, the first end dump trailer being a frame type trailer; and
   a second end dump trailer for attachment to said fifth wheel of said first end dump trailer at the pedestal when the pedestal is in the rearward, towing position, the second end dump trailer dumping its load when attached to the first end dump trailer.

* * * * *